Feb. 27, 1940. C. W. KING 2,192,135
INSULATED HATCH COVER FOR SHIPS
Filed April 23, 1937 3 Sheets-Sheet 1
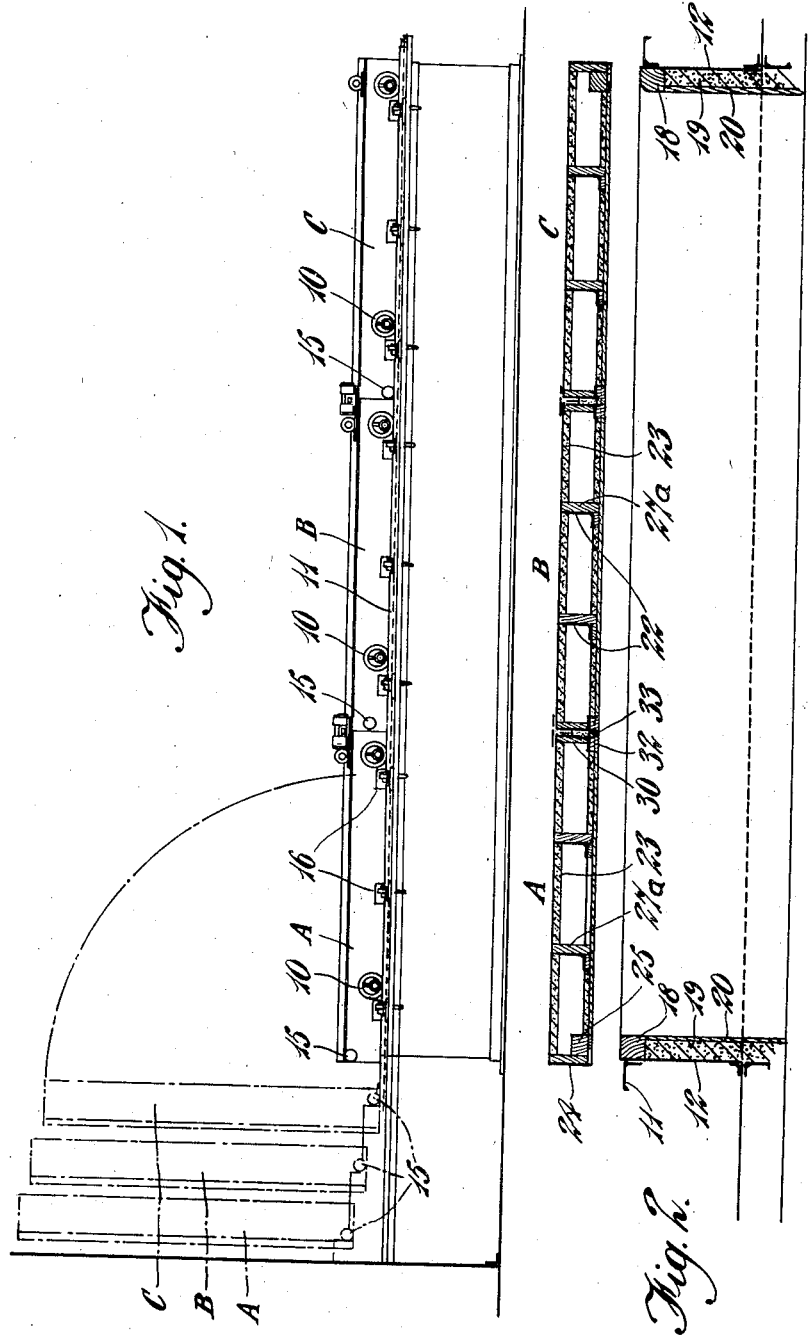
INVENTOR
CHARLES WILLIAM KING
BY
Maxwell E. Sparrow
ATTORNEY

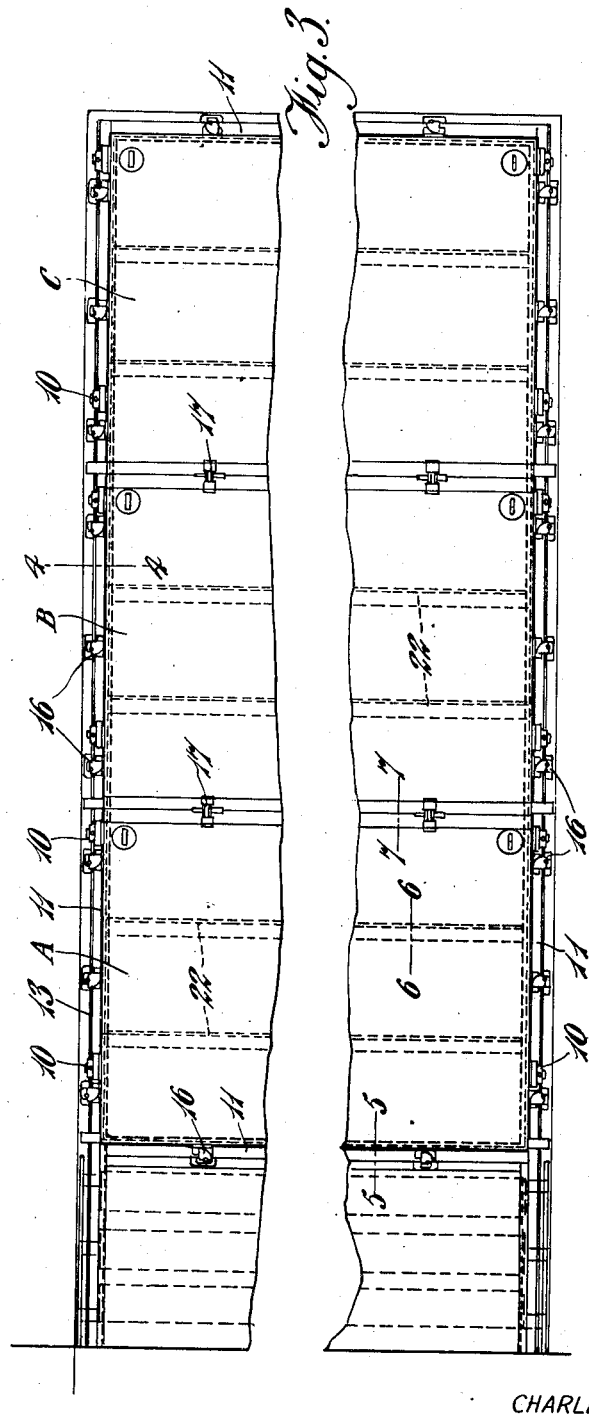

Feb. 27, 1940.    C. W. KING    2,192,135
INSULATED HATCH COVER FOR SHIPS
Filed April 23, 1937    3 Sheets-Sheet 3
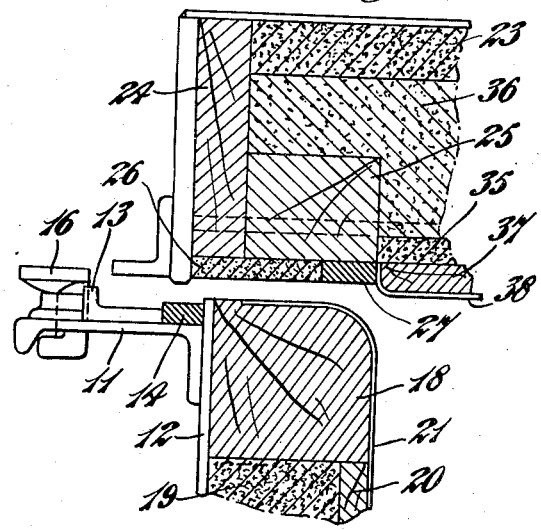
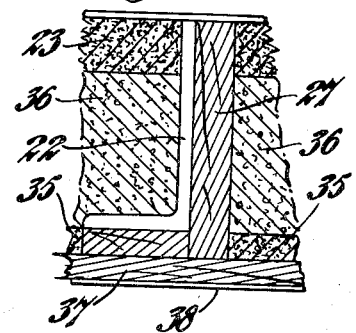
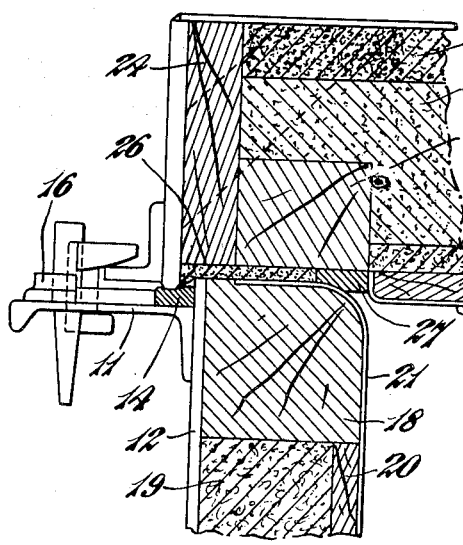
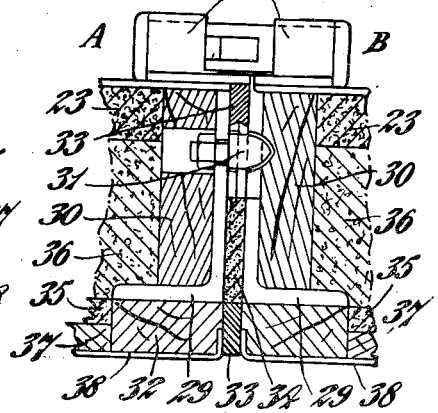
INVENTOR
CHARLES WILLIAM KING
BY
ATTORNEY Patented Feb. 27, 1940

2,192,135

UNITED STATES PATENT OFFICE 2,192,135

INSULATED HATCH COVER FOR SHIPS

Charles William King, London, England, assignor to MacGregor & King Limited, London, England, a British company Application April 23, 1937, Serial No. 138,514
In Great Britain June 24, 1936

6 Claims. (Cl. 114—201)

This invention relates to improvements in insulated hatch covers for ships, and has for its chief object to provide an improved construction of heat insulated hatch cover which will be particularly useful on ships carrying cargo which has to be kept in cold storage during the voyage. Heretofore it has been usual in ships intended to keep cargo in cold storage during the voyage to provide heat insulated plug hatches which fit tightly into the hatchways and above which the usual wooden hatches, tarpaulins and other fittings are arranged. These plug hatches are made in comparatively small sections and the whole arrangement is not only cumbersome and expensive since it requires additional fore and aft beams, but involves considerable time and labour when the ship is loading or unloading. The chief object of the present invention is to overcome the necessity of providing heat insulated plug hatches and at the same time to provide a simple and highly efficient form of hatch covering that embodies both protective hatch covers and insulation for use in conditions such as are referred to above.

According to the present invention the hatch covers are made of steel and are themselves adequately lined with heat insulating material, means being provided to secure an efficient and gas-tight, or substantially gas-tight, joint between the insulated cover and the coaming which is, of course, itself lined with heat insulating material.

The complete hatch cover is conveniently formed of a plurality of sections, in which case means are also provided to secure an efficient and gas-tight, or substantially gas-tight, joint between the sections.

The arrangement of the cover sections and the method of manipulating the same are conveniently in accordance with one or more of the British Patents Nos. 305,836, 315,557, 321,741, 337,975, 353,364 and 354,643, although I wish it to be clearly understood that the present invention is by no means limited to any particular construction and arrangement of the actual cover sections. The cover sections may be arranged and manipulated in any desired manner without departing from the scope of the present invention. Preferably, however, the cover sections are provided with eccentric bush rollers (for example, as described in British specification No. 305,836) or alternative means are provided whereby when the cover sections are to be rolled out of position their weight is taken by the rollers whereas when the cover sections are in position the weight of the same is taken off the rollers and brought to bear on the packing thus giving an effective water-tight and gas-tight joint.

The cover sections and coamings may be lined with heat insulating material in any suitable way and of any suitable form without departing from the scope of the present invention.

In order that this invention may be the more clearly understood and readily carried into effect, I will proceed to describe the same with reference to the accompanying drawings, which illustrate by way of example and not of limitation one convenient embodiment of this invention, and in which:

Figure 1 is a side elevation of the hatch and cover showing the method of manipulating the hatch cover sections.

Figure 2 is a longitudinal section through the hatch and hatch cover showing the sections of the hatch cover raised clear of the hatch and ready to be run off the same.

Figure 3 is a plan view of the hatch and cover shown in Figure 1.

Figure 4 is a local section on line 4—4 of Figure 3 showing the hatch cover section raised off the coaming ready to be rolled off.

Figure 5 is a local section on line 5—5 of Figure 3 showing the hatch section lowered and clamped in position to cover the hatch.

Figure 6 is a section on line 6—6 of Figure 3 illustrating the method of heat insulating the stiffeners of the hatch cover sections; and Figure 7 is a section on line 7—7 of Figure 3 showing the method of heat insulating the joint between the hatch cover sections.

Referring now to the drawings, the hatch cover therein illustrated comprises three sections A, B and C, each of which is provided with eccentric bush rollers 10, as described in prior British Patent No. 305,836, these rollers being adapted, when it is desired to remove the hatch cover sections, to engage with a track rail 11 which is mounted on the outside of the coaming 12. The coaming 12 extends above the level of the track rail 11 so as to form a safety lip to prevent the rollers 10 running into the hatch opening and there is also provided on the track rail 11 a wheel guide 13 and packing 14 (see Figure 4) with which the lower edge of the hatch cover section engages when the same is lowered (see Figure 5). The track rails 11 are extended along the ends of the coaming (see Figure 5) but as at these parts they are not engaged by rollers the wheel guides 13 are omitted, the packing 14 being retained, however, in order that a good joint may be secured all round the hatch.

The hatch cover sections are provided at their sides with appropriately positioned pivots 15 about which they may be swung up, to the position shown in dotted lines in Figure 1, clear of the hatch after they have been rolled along the track rails 11 to the required extent. 16 are cleats, preferably of the form covered by prior British Patent No. 335,012 for holding the hatch cover sections in their lowered position and 17 are butt-cleats for holding the abutting edges of the hatch cover sections together.

It will be appreciated that the above described construction and arrangement of steel hatch cover, which is already known, forms no essential part of the present invention and the same may, therefore, be modified as desired without departing from the scope of the present invention.

Turning now to the insulation of such a hatch cover which forms the subject-matter of the present invention and dealing first with the coaming 12, this is provided at its upper edge with a wooden or other suitable coping 18, say six inches by five inches, and below this coping is lined with a heat insulating material 19 such as slab cork which, in turn, is covered with a thick wooden or like facing 20. The inside of the coping is conveniently provided with a steel sheathing 21 which does not, however, at any point make contact with the coaming itself, it extending over the top of the coping 18 but terminating well clear of the coaming 12.

The cover sections A, B and C themselves, which are formed of sheet steel with suitable L-shaped transverse stiffeners 22 (Figures 2, 3 and 6) are lined on all exposed faces (top, sides and ends) with a thick lining, say two inches thick, of a heat insulating material. Any suitable heat insulating material such, for example, as slab cork, may be used without departing from the scope of the present invention but I prefer to line the top of the cover sections with a thick lining of slab cork 23 and to use thick wood insulation 24 also about two inches thick on the vertical walls of the cover sections. The walls of the cover sections which seat down on to the packing 14 extend below the heat insulation in order that they may engage with the packing, and the lower ends of the wooden linings 24 are provided with inwardly projecting wooden reinforcements 25, say five inches by four inches, which extend out over the coping 18 and form a good solid seat therewith. The lower ends of the linings 24 and the reinforcements 25 are provided with a layer of resilient material such as rubber, felt or the like to ensure a gas-tight joint between the coping and the cover section. Preferably I use a composite layer consisting of an outer sheet of resilient material 26 such as that sold under the trade-mark "Langite" and an inner strip 27 of rubber which engages with the curved part of the sheathing 21 on the coping when the cover section is lowered (see Figure 5).

The intermediate transverse L-shaped stiffeners 22 are lined on one vertical face with a lining, say two inches thick, of wood 27ª and a like strip of wood 28, say one inch thick, is applied to the underside of the foot of the stiffener (see Figure 6). The inside surface of the stiffener 22 is conveniently unprovided with any special lining but it may, if desired, be lined with heat insulating material. The strip 28 is of such a thickness that its lower face is on a level with the bottom of the wood lining 24.

The end stiffeners 29 of the cover sections which abut against one another when the cover is in position are L-shaped similar to the intermediate stiffeners 22 but in this case, of course, the feet always project under the hatch cover section with which they are associated. These end stiffeners 29 (see Figure 7) are insulated on the inside by a vertical lining 30 of heat insulating material preferably wood, and one of the same is provided with a plurality of positioning studs, one of which may be seen at 31 (Figure 7) as described in my prior patents above referred to. To the underside of the bases of the stiffeners 29 is applied a facing 32 of heat insulating material such as wood, this facing being of a greater thickness than the lining 28 applied to the intermediate stiffeners 22 so that its lower face extends below the level of the lining 24.

The joint between the cover sections is heat insulated and rendered gas-tight by means of upper and lower strips of rubber or like resilient material 33 which are compressed by the butt cleats 17, the lower strip being interposed between the facings 32 as can be seen in Figure 7. There is also preferably provided an intermediate strip 34 of a suitable material such as felt or that sold under the trade-mark "Langite".

A sheet of slab cork 35, say one inch thick, is now applied to the bottom of the hatch cover section. The hatch cover section is thus divided into a plurality of compartments each of which is preferably filled with a suitable granular heat insulating material such as granulated cork 36.

Over the bottom surface of the slab cork sheet 35 is applied a layer of wood 37 and the whole is sheathed with metal 38.

In the case where the joint between the cover sections is a butt joint (as, for example, in the case of the hatch cover construction described in British specification No. 305,836), one of the juxtaposed stiffeners is conveniently provided with upper and lower packing strips of rubber or the like which abut against the opposed stiffener and, in addition, there is interposed a strip of felt or the like between the meeting edges of the lower sheets of heat insulating material.

In the case of a stepped joint between the cover sections (as, for example, in the case of the hatch cover construction described in British specification No. 337,975), the inner end of the lower hatch cover construction is dealt with as an auxiliary coaming and is provided with a thick lining of heat insulating material such as slab cork and is also conveniently provided with a metal sheath which does not, however, make contact with the hatch cover section itself.

From the above it can be seen that there has been provided a hatch construction for ships or the like comprising a plurality of steel hatch cover sections cooperating to form a steel hatch cover to the outside edges of which hatch cover sections there are secured reinforcing blocks of wood, a coaming cooperating with the steel hatch cover to the upper end of which coaming there is connected a wooden coping, a lining of heat insulating material attached to the coaming and below the coping, the heat insulating material on the coaming being covered by a metallic sheathing which extends over the top of the coping to a point adjacent the coaming and terminating short thereof whereby the coaming and sheathing are insulated from each other, there being further provided means for producing a gas-tight joint between the coping and an adjacent reinforcing block of the hatch cover section when same are in cooperating position, and also means for producing a gas-tight joint between the hatch cover sections.

Many modifications of the above described construction of insulated steel hatch cover will be apparent to those skilled in the art, and such modifications may obviously be made without departing from the scope of the present invention as defined in the appended claims.

I claim:

1. A hatch construction for ships or the like comprising a plurality of steel hatch cover sections cooperating to form a steel hatch cover, a coaming cooperating therewith, a lining of heat insulation secured to each of said hatch cover sections, a lining of heat insulating material attached to said coaming, a metallic sheathing covering the heat insulating material on said coaming and extending above the coaming insulating material to a point adjacent said coaming and terminating short thereof whereby the coaming and sheathing are insulated from each other, means for producing a gas-tight joint between said coaming and an adjacent hatch cover section when same are in cooperating position, and means for producing a gas-tight joint between said hatch cover sections.

2. A hatch construction for ships or the like comprising a plurality of steel hatch cover sections cooperating to form a steel hatch cover, a coaming cooperating therewith, a wooden coping connected to the upper end of said coaming, a lining of heat insulation secured to each of said hatch cover sections, a lining of heat insulating material attached to said coaming and below said coping, a metallic sheathing covering the heat insulating material on said coaming and extending over the top of said coping to a point adjacent said coaming and terminating short thereof whereby said coaming and sheathing are insulated from each other, means for producing a gas-tight joint between said coaming and an adjacent hatch cover section when same are in cooperating position, and means for producing a gas-tight joint between said hatch cover sections.

3. A hatch construction for ships or the like comprising a plurality of steel hatch cover sections cooperating to form a steel hatch cover, a coaming cooperating therewith, a wooden coping connected to the upper end of said coaming, a lining of heat insulation secured to each of said hatch cover sections, a lining of heat insulating material attached to said coaming and below said coping, a metallic sheathing covering the heat insulating material on said coaming and extending over the top of said coping to a point adjacent said coaming and terminating short thereof whereby said coaming and sheathing are insulated from each other, means for producing a gas-tight joint between said coping and an adjacent hatch cover section when same are in cooperating position, said means including resilient jointing material disposed between the heat insulating material on the hatch cover sections and the heat insulating material at the coaming and sheathing thereof, and means for producing a gas-tight joint between said hatch cover sections.

4. A hatch construction for ships or the like comprising a plurality of steel hatch cover sections cooperating to form a steel hatch cover, reinforcing blocks of wood secured to the outside edges of said hatch cover sections, a coaming cooperating with said steel hatch cover, a wooden coping connected to the upper end of said coaming, a lining of heat insulation secured to each of said hatch cover sections, a lining of heat insulating material attached to said coaming and below said coping, a metallic sheathing covering the heat insulating material on said coaming and extending over the top of said coping to a point adjacent said coaming and terminating short thereof whereby said coaming and sheathing are insulated from each other, means for producing a gas-tight joint between said coping and an adjacent reinforcing block of said hatch cover section when same are in cooperating position, and means for producing a gas-tight joint between said hatch cover sections.

5. A hatch construction for ships or the like comprising a steel hatch cover, a coaming cooperating therewith, said cover including heat insulating material and a reinforcing end block, a coping fixed to said coaming, a lining of heat insulating material attached to said coaming and below said coping, a metallic sheathing covering the heat insulating material on said coaming and extending over the top of the coping to a point adjacent said coaming and terminating short thereof whereby the coaming and sheathing are insulated from each other, and a metallic sheathing fixed to said cover, said cover sheathing terminating adjacent said coaming sheathing and being spaced from the latter when in cooperating position.

6. A hatch construction for ships or the like comprising a steel hatch cover, a coaming cooperating therewith, said cover including heat insulating material and a reinforcing end block, a coping fixed to said coaming, a lining of heat insulating material attached to said coaming and below said coping, a metallic sheathing covering the heat insulating material on said coaming and extending over the top of the coping to a point adjacent said coaming and terminating short thereof whereby the coaming and sheathing are insulated from each other, a metallic sheathing fixed to said cover, said cover sheathing terminating adjacent said coaming sheathing and being spaced from the latter when in cooperating position, and a composite layer between said block and said coaming sheathing, said composite layer including a rubber strip engageable with adjacent parts of said coaming and cover sheathings.

CHARLES WILLIAM KING.